United States Patent [19]
Calfee

[11] 3,755,059
[45] Aug. 28, 1973

[54] HIGH IMPACT STRENGTH IN GRAPHITE FIBER LAMINATES

[75] Inventor: John D. Calfee, Raleigh, N.C.

[73] Assignee: Monsanto Company, St. Louis, Mo.

[22] Filed: Apr. 26, 1971

[21] Appl. No.: 137,499

[52] U.S. Cl. .................. 161/93, 161/60, 161/135, 161/137, 161/143
[51] Int. Cl. ............................................ B32b 15/00
[58] Field of Search ............... 161/57, 60, 93, 135, 161/137, 143, 156

[56] References Cited
UNITED STATES PATENTS
3,649,435   3/1972   Varlas .................................. 161/156

Primary Examiner—William A. Powell
Assistant Examiner—James J. Bell
Attorney—Vance A. Smith, J. Bowen Ross, Neal E. Willis and John D. Upham

[57] ABSTRACT

A laminar composite of high impact and shearing resistance comprises layers of graphite fiber, glass fiber, and corrugated metal foil in an arrangement which resists spalling, interlaminar shearing, and multipoint failure due to shock wave transmission.

8 Claims, 6 Drawing Figures

Patented Aug. 28, 1973

3,755,059

INVENTOR.
JOHN D. CALFEE

BY *Vance C. Smith*

ATTORNEY

3,755,059

HIGH IMPACT STRENGTH IN GRAPHITE FIBER LAMINATES

CROSS-REFERENCES TO RELATED INVENTIONS

This application is related to copending applications of John D. Calfee and David A. Zaukelies, Ser. No. 889,395, filed Dec. 31, 1969, and now abandoned and John D. Calfee, Ser. No. 48,961, filed June 24, 1970.

FIELD OF THE INVENTION

The present invention relates to a laminar composite structure and, more particularly, to a graphite fiber-corrugated metal foil structure having improved impact and interlaminar shearing strength.

BACKGROUND OF THE INVENTION

In the referenced copending application Ser. No. 889,395, it was shown that graphite fiber (GF) laminates having layers of metal foil (MF) incorporated therein exhibit increased strength of unexpected magnitudes in directions transverse to the fiber orientation. This was a fruitful discovery since prior thereto when constructing large assemblies of such laminates special bonding or attaching techniques were necessary due to laminate weakness in directions transverse to the fiber orientation. Ordinary bolt and nut attachments shear the graphite fibers away from the matrix. Cross-plying techniques are self-defeating since this diminished the very properties desired, i.e., specific strengths and modulus. The addition of the metal foil minimized the above defects.

Recent events have shown that GF laminates alone may not be used in constructions which experience impacts. Because graphite fibers have a high modulus and accompanying low elongation to break, they are very brittle. Only moderate impacts will cause GF laminates to crack with higher energy impacts further resulting in catastrophic failure. While demonstrating somewhat higher impact resistance, MF/GF laminates also offer little resistance to impact as may be demonstrated by "falling weight" tests.

An impact resistant laminate was described and claimed in referenced copending application Ser. No. 48,961. The laminate therein comprised both GF layers and strategically located glass fiber layers (G1F). It was unexpectedly found that a glass fiber layer located on the side of the laminate opposite from the side experiencing the impacts significantly improves resistance to impacts. It appears that the glass fiber layer provides a mechanism by which the energy of impact can be dissipated over a large area. When employed solely on the impact side, however, glass fibers do not significantly improve the desired impact properties of the laminate. Further, synergistic improvement in impact resistance was noted when glass fibers comprised the top and bottom layers.

While the GF/G1F and GF/MF/G1F laminates show a particularly high impact resistance, interlaminate shearing becomes quite prevalent as the impact energy levels are increased. Interlaminate shearing is a serious deficiency when the contemplated use in in the aerospace industry. Thus, the primary object of the present invention is to provide for a laminate which is not only resistant to impacts but has a high interlaminate shear strength.

SUMMARY OF THE INVENTION

The impact sensitivity of GF laminates is primarily due to three failure mechanisms:
a. Spalling action on the reverse impact side;
b. Interlaminar shear failure; and
c. Transmission of the shock wave through the structure with resultant multiple failure occurring at the stress risers.

The impact strength of structures under load is much less than for structures not under load and crack failure occurs at multiple points. The shock wave is transmitted essentially without attenuation and, in effect, seeks out the stress risers. Failure occurs at these points.

The present invention was the result of a discovery that a substantial increase in interlaminar shear strength in a GF laminate may be obtained by incorporation therein of corrugated metal foil. By further including glass fiber layers therein, very high impact strength with good overall balance in properties can be obtained in a GF/MF/GlF laminate with the glass fibers controlling the spalling action; corrugated metal foil preventing failure by interlaminar shear; and glass fibers and metal foil preventing catastrophic failure.

BRIEF DESCRIPTION OF THE DRAWINGS

Other objects and advantages will be readily evident after a reading of the description along with the accompanying drawings in which.

DESCRIPTION

Figure 1:
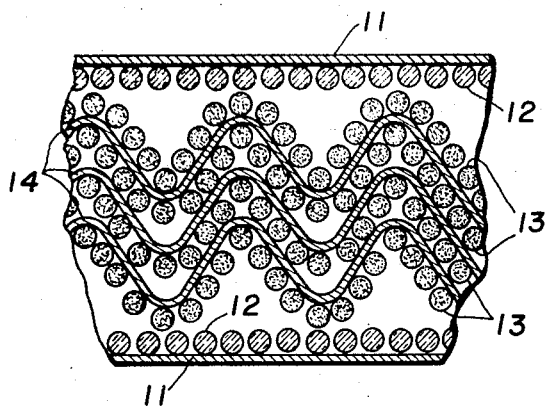
FIG. 1 is a cross-section of a laminar composite in accordance with the present invention.

FIG. 1 illustrates a laminate 10 constructed in accordance with the present invention. Although the fibers are depicted as ordered in a single direction for ease of illustration, it will be understood that the direction of orientation is not a critical limitation and various cross-ply arrangements may be used as desired.

Laminate 10 is fabricated from various layers of materials such as metal foil layers 11, glass fiber layers 12, graphite fiber layers 13, and corrugated metal foil layers 14. The glass fiber layers 12 are illustrated as being exterior to any of the graphite fiber layers 13. As discussed and claimed in referenced copending application Ser. No. 48,961, the location of the glass fiber layer(s) relative to the graphite fiber(s) is important in determining the impact strength of the laminate. It has been noted that positioning at least one glass fiber layer exterior to the graphite fiber layers on the "reverse impact side" of an otherwise all graphite fiber laminate provides significant increase in impact resistance. Similar increases were noted in graphite fiber-metal foil (GF/MF) laminar composites. Further synergistic increases in impact strength were noted when glass fiber layers sandwiched the graphite fiber layers. On the other hand, little or no increase in impact strength was noted when the glass fiber layer was located only on the "impact side."

Since the shear plane in a flat laminar composite passes between adjacent laminations, the sinuous configuration of corrugated foil layers 14 causes the shearing force to pass through layers 14 thereby preventing or significantly diminishing interlaminar shear. It is particularly preferable to position the corrugations of layers 14 parallel to the direction of orientation of the fibers in adjacent layers as shown in FIG. 1.

As will be described in more detail hereinafter, test specimens were impacted with a falling weight. The side of the specimen away from the impact is called the "reverse impact side."

Still other embodiments of the laminates of the present invention may be constructed. For example, glass cloth may be utilized as layers both internally and externally. Still another alternative would be the use of plies of glass fiber-graphite fiber mixture in a single layer which surprisingly gives good impact resistance when positioned properly in a laminate despite contrary prior art teachings of incompatability of the two fibers.

Various metal foils may be employed such as, for example, aluminum, beryllium, magnesium, nickel, steel, and titanium. Steel, however, is the preferred metallic material. The glass fiber itself may be any suitable glass fiber such as, for example, S-glass or E-glass fibers. As an alternate high strength, high modulus organic fibers may be used. It is preferable, however, to employ fibers such as, for example, standard E-glass fibers which have an elongation-to-break of about 2.5 percent or about five times that of the graphite fiber. It is also preferable to limit the volume percent ratio of glass fiber to about a range of 5 to 50 percent with optimum results occurring from about 5 to 30 percent. Larger volume percents of glass fiber begin to significantly diminish the physical characteristics for which graphite fiber was selected.

The graphite fiber utilized may be any one of available graphite fibers such as HMG-50 graphite yarn of PAN derived fiber. The graphite fiber tape with attached metal foil was made by unreeling the graphite yarn and passing it through a heating oven raised to a temperature of about 1250°–1350°C. and filled with nitrogen containing about 0.3 percent oxygen. After cooling the yarn in another chamber filled with nitrogen, it was wound under 80 gm. tension on a lathe-driven 13.5 inch diameter drum covered with a sheet of metal foil. A bisphenol type epoxy resin formulated for good metal adhesive characteristics was added continuously from a nozzle set at the point of juncture of yarn and drum, at a rate such that the resin loading, after evaporation of the solvent, was about 35 weight percent. A transverse mechanism, synchronized with the lathe, slowly laid the impregnated fiber in a single spiraled layer, side-by-side across the face of the drum. The layer of resin and fiber was air-dried on the drum to a solvent content of about 1 percent and then slit from the drum along the overlap of the metal foil. It should be understood that other methods of fabricating such tapes may be employed if desired.

Figure 2:
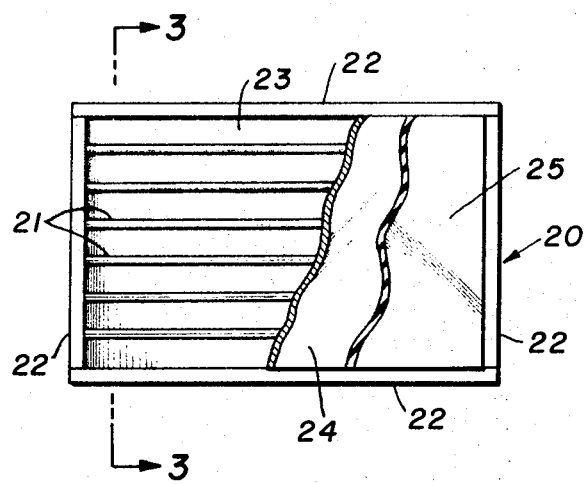
FIG. 2 is a top view of a mold for fabricating laminar composites in accordance with the present invention.
Figure 3:
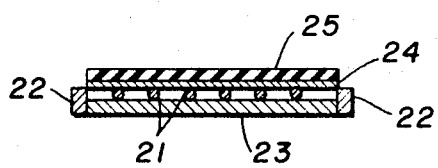
FIG. 3 is an end view of the mold of FIG. 2.

The corrugation of the metal foil may be fabricated by either preforming the metal foil in a die mold or by laying up the GF/MF laminate in the mold and applying pressure. The preferred method of fabricating thick panels, however, is accomplished by using the molding apparatus shown in FIG. 2. The mold may consist of a metal frame 20 which holds ⅛ inch steel rods 21 spaced about ¼ inch apart. The rods are essentially parallel to each other in the same plane and with the two of the sides 22 of frame 20. A rectangular block of steel 23 (seen in FIG. 3) is positioned within the mold but below and in contact with rods 21. The laminate 24 to be pressed consisting of the desired number of GF/MF plies is placed upon rods 21 and covered with a rubber mat 25. Pressure is then exerted to block 23 and mat 25 and transmitted to laminate 24. Because of the high elastic elongation of the rubber, the pressing action is similar to the application of hydraulic pressure. The metal foil then draws in situ and conforms to the configuration of the die. Surprisingly enough, the graphite fibers remain aligned and undamaged. The "valleys" formed in the corrugated panel may then be filled with graphite fiber prepreg. Outer plies of glass fiber tape or cloth may then be added. The laminate composite is then cased in a conventional mold.

Figure 4A:
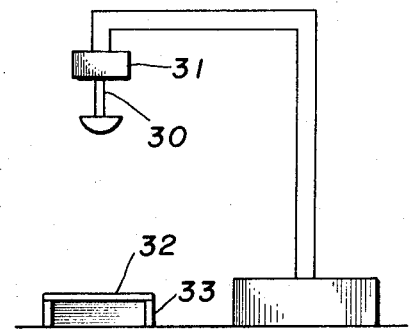
FIGS. 4(a), 4(b), and 4(c) illustrate schematically different modes of testing laminar composites for impact and interlaminar shear resistance.

To generate relevant impact test data, a falling weight test was conducted on the laminar composite specimens. The test consists of dropping a weight on a specimen from a height progressively increased until the falling weight has just enough energy to cause crack formation and then at higher energy levels to break the test specimen. Generally, the test was conducted by allowing a steel dart of known weight and having a predetermined radius of curvature at its tip to fall and strike the test specimen. FIG. 4(a) schematically illustrates a dart 30 attached to electromagnet 31. Positioned a predetermined distance below dart 30 is a test specimen 32 supported about the edges by an open frame 33.

An alternative support may also be employed which consists of a rubber mat resting on a steel anvil. The specimen was then placed on the rubber mat for impacting. At low impact levels, the two supporting systems generally gave essentially equivalent results. At higher impact levels, failure was earlier and more severe for the specimen supported in the open frame. It was found that the results obtained with the open frame support were more in accord with performances in the field.

If it is desired to determine the magnitude of sample distortion at the moment of impact, a single ply of thin metal foil may be placed between the rubber mat and the specimen prior to impacting. The metal foil is permanently distorted at the moment of impact to conform to the maximum distortion of the test specimen.

Figure 4B:
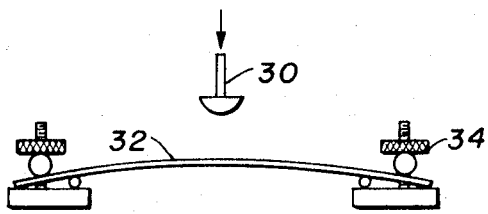
Figure 4C:
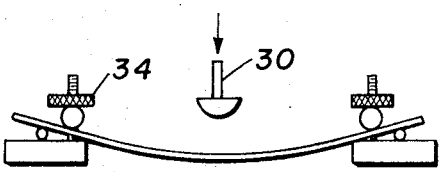

Variations on the open frame support are seen in FIG. 4(a) and 4(b) which enables impact test to be made on specimens under load. In FIG. 4(b), the specimen 32 is flexed with the tension side up and kept in place by tension bolts 32. Impact occurs on the tension side. The reverse is true in FIG. 4(c).

The following tables list representative tests and test results obtained with various constructions of laminar composite specimens.

TABLE 1 (GF COMPOSITES)

ES test with 1.2 lb. weight

| Specimen | Plies | Configuration (degrees) | Drop Drop for Failure(in) |
|---|---|---|---|
| 1 | 4 | 0,90,90,0° | 4 |
| 2 | 4 | 0,90,90,0° | 6 |
| 3 | 7 | 0,+60,−60/0/−60,+60/0° | 6 |
| 4 | 5 | 0,90,0,90,0° | 4 |
| 5 | 4 | 0,0,0,0° | 6 |
| 6 | 16 | 4 at 45°, 8 at 0°, 4 at ±45° | 16 |

The data above illustrate the sensitivity of graphite fiber-resin laminar composites to impacts. Relatively short drops caused fiber fracture on the reverse impact sides. The effect of fiber orientation is minimal. Specimen 2 which was made of a 4 × 10⁵ psi tensile strength fiber in contrast to the 3 × 10⁵ psi fiber in the remaining specimens did not significantly increase the impact strength of the composite.

TABLE 2 (MF/GF COMPOSITE)

ES test with 1.2 lb. weight

| Specimen | Plies | Composition | Configuration | Drop for failure |
|---|---|---|---|---|
| 7 | 2,3,4,5 | GF | 0,90,90,0° | 8 |
|  | 1 and 6 | 2 mil steel |  |  |
| 8 | 2,4,6,8 | GF | 0,90,90,0° | 8 |
|  | 1,3,5,7,9 | 5 mil Al |  |  |
| 9 | 2,4,6,8,10,12,14 16,18 | GF | all 0° | 12 |
|  | 1,3,5,7,9,11,13,15 17,19,21 | 5 mil Al |  |  |
| 10 | 2,3,4,5 | GF | 0,90,90,0° | 4 |
|  | 1,3,5,7 | 2 mil Al |  |  |

Some improvement is noted in impact strength over the results in Table 1. This, however, is due in part to the increased thickness of the test specimens. Inspection of the samples revealed the metal foil was well bonded to the graphite fiber/epoxy ply. Initial failure occurred by formation of a crack in the metal foil which was an outward extension of the crack in the graphite fiber phase. No drawing of the flat metal foil occurred. It should be pointed out that while MF/GF laminate are not greatly superior in initial failure strength, it was observed that they were more resistant to catastrophic failure at high impact energy levels. Steel is the preferred material for the metal foils.

TABLE 3 (MF/G1F/GF COMPOSITE)

ES Test with 1.2 lb. weight

| specimen | Plies | Composition | Configuration | Drop for failure (in) |
|---|---|---|---|---|
| 12 | 5,7,9 | GF | 0,90,0° | 32 |
|  | 1,4,6,8,10,13 | 2 mil Al |  |  |
|  | 2,3,11,12 | G1F | 0,90,90,0° |  |
| 13 | 4,6,8,10 | GF | 0,90,90,0° | 32 |
|  | 2,12 | G1F | 0,0° |  |
|  | 1,3,5,7,9,11,13 | 2 mil steel |  |  |
| 14 | 4,6,8,10 | GF | 90,0,90,0° | 16 |
|  | 2,12 | G1F | 0,0° |  |
|  | 1,3,5,7,9,11,13 | 2.65 mil Ti |  |  |
| 15 | 6,8,10,12 | GF | 90,0,0,90° | 32+ |
|  | 2,4,14,16 | G1F | 0,0,0,0 |  |
|  | 1,3,5,7,9,11,13, 15,17 | 5 mil Al |  |  |

A significant increase in impact strength was observed in Table 3. The values obtained for drop-to-failure were several times greater than GF laminar composites.

When thick plates of about 79 mils were fabricated to explore the excellent impact strengths of MF/GF/G1F laminar composites, it was necessary to increase the weight of the impact darts from 1.2 lbs. to 4.5 lbs. Although no catastropic failure was observed at drops of 32 inches, it was noted that the composite failed due to interlaminar shear. Panels made without incorporating outer plies of glass fibers exhibited severe interlaminar shear failure (along with the other failure mechanisms) upon impact. Thus, it was found that interlaminar shear failure also played a critical role in determining impact strength of GF/MF/GF, and MF/GF/G1F laminates. The results listed below in Table 4 were obtained from imparting a MF/GF/G1F laminar composite where some of the metal foil layers were corrugated.

TABLE 4 (MF/GF/G1F)

ES Test with 4.5 lb. weight

| specimen | Plies | Composition | Configuration | Drop for failure (in) |
|---|---|---|---|---|
| 16 | 1,2,3,4 | G1F | 0,90,90,0° | 32 |
|  | 5,7,9,11 | GF | all 0° |  |
|  | 6,8,10 | 2 mil steel | corrugated with ridges ½"apart and parallel fibers |  |
| 17 | 1,14 | 2 mil steel |  |  |
|  | 2,13 | glass cloth |  |  |
|  | 4,6,8, 10,12 | GF | 0,90° | 32 |
|  | 3,5,7,9, | 1 mil | all 90° corrugated with ridges ½" apart and parallel fibers |  |
|  | 11 | steel foil |  |  |
| 18 | 1,13 | glass cloth | 0,90° | 32+ |
|  | 2,4,6,8, 10,12, | GF | all 0° |  |
|  | 3,5,7, | 2 mil | corrugated ridges ½" apart and parallel fibers |  |
|  | 9,11, | steel foil |  |  |

Although specimen 16 was subjected to high impact energy, it sustained only slight mechanical damage, retained load bearing capacity, and showed no indication of multipoint failure. There was a small amount of interlaminar shear failure at the GF/G1F interface. Further increase in performance was achieved by specimens 17 and 18 which used glass cloth in place of plies of uniaxial oriented glass fiber. No distortion or indentation was found. No interlaminar shear failure or fiber breakage was noted at a drop of 32 inches. This should be contrasted to the 16 ply GF composite (specimen 6) which failed at a drop of 16 inches. Impacted at high impact energy level, i.e., 4.5 lb. weight dropped from 32 inches, a 12 ply GF composite disintegrated explosively.

In summary, it may be seen that incorporation of corrugated metal foil into GF and GF/G1F laminar composites significantly improves the interlaminar shear strength of the composite. Studies made by impacting the laminates in directions transverse the plane of the laminate, parallel to the plane and fibers, and parallel to the plane but transverse to the fibers have shown that the laminates have superior impact strengths to GF, GF/G1F, GF/MF, and uncorrugated MF/GF/G1F composites.

What I claim is:

1. A composite laminate having improved interlaminar shear strength comprising
    a. a plurality of graphite fiber layers and
    b. a plurality of corrugated metal foil layers.

2. The laminate of claim 1 wherein the corrugated metal foil layers interleave the graphite fiber layers.

3. The laminate of claim 2 wherein the corrugations of the metal foil are parallel to the adjacent graphite fiber layers.

4. The laminate of claim 3 wherein glass fiber layers sandwich the graphite fiber layers.

5. The laminate of claim 3 wherein the corrugated metal foil layers are selected from a group consisting of aluminum, beryllium, magnesium, nickel, steel, and titanium.

6. The laminate of claim 1 including at least one layer of glass fiber located on the reverse impact side of said laminate and exterior to all of said graphite fiber layers.

7. The laminate of claim 6 wherein glass cloth comprise the glass fiber layers.

8. The laminate of claim 7 where the corrugated metal foil is steel.

* * * * *